United States Patent Office 2,958,584
Patented Nov. 1, 1960

2,958,584
PROCESS FOR PREPARATION OF HYDROCYANIC ACID

Herbert S. Johnson, Shawinigan South, Quebec, Canada, and Arthur H. Andersen, Mount Royal, Quebec, Canada, assignors to Shawinigan Chemicals Limited, Quebec, Canada, a corporation of Canada No Drawing. Filed Aug. 21, 1959, Ser. No. 835,178

8 Claims. (Cl. 23—151)

This invention relates to the preparation of hydrocyanic acid from ammonia in a fluidized bed apparatus heated by the passage of electricity through the fluidized bed.

The production of hydrocyanic acid from ammonia and gaseous hydrocarbons has been thoroughly investigated. The decomposition of both reactants at the temperatures necessary to sustain the reaction, the amounts of useless by-products formed by the reaction, the apparent need for expensive and easily poisoned catalysts, such as platinum, and the difficulty involved in providing a rapid supply of heat to the reacting gases at very high temperatures are a few of the many problems that prevented the commercial application of this reaction.

It is the principal object of this invention to carry out the reaction of ammonia and hydrocarbon gas in a fluidized bed of carbon particles to form hydrocyanic acid. It is a further object of this invention to react ammonia gas with the carbon particles to form hydrocyanic acid simultaneously with the foregoing reaction. Further objects of this invention will be apparent from the description to follow.

Throughout this specification the hydrocarbon gas referred to includes hydrocarbon gases such as methane, ethane, propane, butane, ethylene, propylene, and mixtures thereof such as natural gas. Higher hydrocarbons may also be employed.

It has been observed that sufficient heat can be generated by passing an electric current through a fluidized bed of conductive carbon particles to supply the endothermic heat of reaction necessary to form hydrocyanic acid when ammonia is reacted with gaseous hydrocarbons or with carbon particles forming the bed or with both simultaneously. It is thus possible, by passing an electric current through such a fluidized bed, to obtain the necessary very high temperatures and to control such temperatures within a fairly constant and narrow range. The invention thus consists in a process for preparing hydrocyanic acid which comprises passing a stream of reactant gas comprising ammonia through a reaction zone in contact with hot electrically conductive carbon particles, maintaining a fluidized bed of said carbon particles in a dense fluidized state by the upward passage therethrough of a fluidizing gas selected from the group consisting of said reactant gas and a gas substantially inert to reaction with said carbon particles, maintaining circulation of carbon particles between said reaction zone and said fluidized bed, passing an electric current of sufficient power through the fluidized bed to maintain it at an elevated temperature sufficient to sustain reaction between the reactant gas and carbon particles to form hydrocyanic acid, separating carbon particles from product gases coming from the reaction zone, and recovering hydrocyanic acid from said product gases. The invention further consists in a process as aforesaid in which the reactant gas comprises ammonia and hydrocarbon gas.

In one specific form of the invention, the fluidized bed of carbon particles is also the reaction zone in which the reactant gas contacts the hot carbon particles, the bed is fluidized by the reactant gas, and circulation of carbon particles between the reaction zone and the fluidized bed is merely circulation within the fluidized bed; in this form of the invention the heat required for the endothermic reactions is generated by passage of electricity in the reaction zone.

In another specific form of the invention the reaction zone is separate from the fluidized bed but connected thereto for circulation of carbon particles carrying heat between the two, reactant gas contacts the carbon particles in the reaction zone, and the fluidized bed, in which heat is generated by passage of electricity, is fluidized with gas independently of the flow of reactant gas in the reaction zone and conveniently gas inert to the carbon particles. For this specific form of the invention use is conveniently made of some form of "transfer line reactor" in which a continuous stream of carbon particles is withdrawn from a fluidized bed of carbon particles, reactant gas flowing in a rapid stream is mixed with the stream of particles to entrain them and form a dilute suspension of the particles in the gas while they pass through a reaction zone, after passage through the reaction zone the particles and gas are separated, the gas recovered and the particles returned to the fluidized bed. With this form of the invention it is possible to obtain shorter and more closely and readily controlled contact times than can be obtained with the previously described form. Gas inert to the carbon particles, for fluidizing the dense bed, conveniently can be, for example, nitrogen, hdyrogen, hydrocarbon gas, or carbon monoxide.

Coke is particularly suitable for use in forming the fluidized bed, because of its good electrical conductivity. Preferably, use is made of fluid petroleum coke, calcined by heating to drive off volatile matter and increase its conductivity. Fluid petroleum coke is the by-product of fluidized bed petroleum cracking processes and is available in particulate form which makes it readily suitable for use in the process of the present invention.

It will be observed that, by reacting ammonia with gaseous hydrocarbon in a dilute suspension or dense fluidized bed of carbon particles heated by passage of electricity, simultaneous use can be made of two reactions forming hydrocyanic acid. With propane as the hydrocarbon, for example, the equations for the reactions are

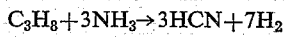

$$C_3H_8 + 3NH_3 \rightarrow 3HCN + 7H_2$$

and

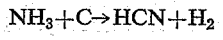

$$NH_3 + C \rightarrow HCN + H_2$$

In the process of this invention, the ammonia-hydrocarbon reaction is the more important, but because of the ammonia-carbon reaction, more ammonia than the stoichiometric equivalent of a given quantity of hydrocarbon gas can be reacted. To take advantage of this, the ratio of ammonia to hydrocarbon gas to be reacted can be adjusted to make allowance for the contribution from the carbon bed. For example, with methane as the hydrocarbon, ammonia:methane ratios as high as 5:3 have been used successfully, and with propane as the hydrocarbon, ammonia:propane ratios as high as 5:1 have been used successfully. However, stoichiometric proportions are eminently satisfactory, and the process can also be carried out successfully utilizing proportions of ammonia even less than the stoichiometric equivalent of the hydrocarbon gas being reacted.

Both reactions hereinbefore mentioned are highly endothermic and require high temperatures to achieve practicable rates of reaction. At such temperatures the ammonia, hydrocarbons, and hydrocyanic acid tend to decompose. However, within the range of temperatures readily achieved and utilized in the process of this invention the higher temperatures provide higher yields of hydrocyanic acid, other reaction conditions being maintained substantially constant. Convenient temperatures are, for example, between 1300° C. and 1600° C.

Other reaction conditions include, for example, the ratio of reactants, the contact time between gaseous reactants and heated carbon particles, and the presence of promoters for the reaction in the reactant gas. When the reaction zone is the fluidized bed, the rate of gas flow through the bed is important, since it is a major factor governing the contact time. With other reaction conditions being substantially constant, short contact times which provide adequate ammonia conversion are preferred to achieve high yields of hydrocyanic acid, rather than longer contact times giving equivalent ammonia conversion; this is due primarily to the fact that the hydrocyanic acid, as well as the hydrocarbons and ammonia, is unstable with respect to its elements at the elevated temperatures in the fluid bed. Effective short contact times can be smaller than one second. Contact times between about 0.5 and 0.1 second give high yields and are critical for the attainment of these high yields.

The reaction between ammonia and hydrocarbons catalyzed by alumina-containing catalysts has been promoted by volatile sulphur compounds, for example $H_2S$ and $CS_2$ (c.f. Chem. Abstr., 50, 16,049 (1956)). In the practice of the present invention, wherein no solid catalyst is used, it has been observed that $CS_2$ promotes the reaction between ammonia and carbon, and this promotion is illustrated in the examples herein. Since the ammonia-carbon reaction is present throughout the process of this invention, the overall process is thus promoted by the presence of the volatile sulphur compound. It has also been observed that fluid petroleum coke which still contains relatively high proportions of sulphur compounds, which volatilize under the conditions extant in the process of this invention, produces higher yields than coke from which most or all of the sulphur has been removed before or during use in the process.

EXAMPLES

The following examples illustrate various specific embodiments of the invention. They were carried out in a small laboratory scale apparatus consisting of a cylindrical reactor made of "Vycor" high temperature-resistant glass with requisite inlets and outlets, and having the required auxiliary feeding, collecting, and analytical equipment for measuring the reactants and products. The reactor was about 38 cm. long and 34 mm. inside diameter, mounted vertically. The top and bottom were closed with rubber stoppers. Reactant gas entered the reactor by an inlet tube through the bottom stopper, and was distributed over the cross-section of the reactor by means of a porous carbon diffusing disk. A layer about 4 cm. thick of fluid petroleum coke, byproduct of a fluidized bed petroleum cracking process, was supported on the porous disk. The coke was preliminarily calcined and screened to remove particles retained on a 14 mesh U.S. Standard Sieve. A thermocouple well and two 6 mm. diameter graphite electrodes passed through the top stopper and penetrated the bed of coke particles. The electrodes were mounted parallel and spaced about 10 mm. apart. An outlet line through the top stopper conducted the product gases to the recovery and analytical apparatus. The electrodes were connected to a 220 volt A.C. source through a variable autotransformer. Current and voltage applied to the electrodes were measured and adjusted to provide sufficient power to maintain the bed of coke particles at the required temperature during reaction. Temperature in the bed of coke particles was measured to an accuracy of 50° C. with a thermocouple having platinum vs. platinum-rhodium elements in the thermocouple well. Currents of 10 to 15 amps. at voltages of 240 to 280 volts were found adequate to maintain the fluidized bed at the desired elevated temperature for these examples. With the fluidized bed at the desired temperature the examples were carried out by passing the reactant gas through a calibrated positive displacement pump, a flowmeter, and into the bottom inlet of the reactor at the desired rate. Reaction took place as the gases flowed through the fluidized bed, and the product gases leaving the fluidized bed were measured and analyzed.

To analyze the product gases, a measured sample thereof (254 ml.) was collected over mercury in a sample holder, during the subsequently described measurement of rate of gas production. The collected sample was passed through a bubbler containing a 5% aqueous solution of $H_2SO_4$ which absorbed the ammonia and some of the hydrocyanic acid (HCN) in the sample, then through two bubblers in series containing a 5% aqueous solution of NaOH which absorbed the remaining HCN in the sample. The solutions from the bubblers were combined and analyzed for ammonia content by the Kjeldahl method and for HCN content by a method described by Kolthoff and Furman in Volumetric Analysis, vol. II, page 404 (1929 ed). According to the method, the sample is acidified with $H_3PO_4$ and treated with excess bromine water to form bromine cyanide; excess bromine is removed with phenol, then the bromine cyanide is decomposed with potassium iodide and the liberated iodine titrated with sodium thiosulphate. From these analyses the relative proportions of ammonia, HCN, and residual gas in the product gases were calculated.

To measure the rate of production of the product gases, the gases coming from the reactor were directed for a measured time interval (10 minutes) through a series of three bubblers containing 5% aqueous $H_2SO_4$ and NaOH solutions to absorb ammonia and HCN as was done in the analyses, and the residual gas was passed through a wet test meter. The rate of production of the residual gas was calculated from the meter reading, corrected for the sample used for analysis, and with the previously determined product gas analysis the rates of production of HCN and of the total product gases, and the rate of recovery of ammonia, were calculated. From these rates were calculated the yield of HCN on the ammonia fed to the reaction, the ammonia conversion, and the yield of HCN based on the ammonia converted. The gas flows measured in these and the other examples in this specification were measured at 25° C. and atmospheric pressure.

In the following Table I are reported the results for Examples 1 and 2 in which ammonia as the sole reactant gas was used to fluidize and react with carbon at a temperature of 1500° C. The table reports in column 1 the rate of ammonia feed to the reactor in liters per 10 minute interval, columns 2 and 3 the percentages of HCN and ammonia in the product gases, column 4 the flow rate of residual gas (product gas with HCN and ammonia removed) in liters per 10 minute interval, column 5 the HCN yield based on the ammonia fed during the reaction, column 6 the ammonia conversion i.e. percentage of the ammonia feed that is not recoverable as ammonia in the product gas, and column the HCN yield based on the ammonia converted.

Table I also includes the results for Examples 3-5 inclusive, which examples were carried out in the same manner and temperature as the previous ones except that the ammonia in each of these examples was augmented by inclusion of 0.5%, 1%, and 2% by volume respectively of vaporized carbon disulphide ($CS_2$). From the results it can be seen that the presence of the $CS_2$ has increased the yield of HCN.

In addition to yield figures based on the measured gas volumes, it is also possible to calculate the yield of HCN from just the analysis of the product gas, by assuming that the gas flow rates are constant and that the only reactions occurring are those represented by the equations $$NH_3 + C \rightarrow HCN + H_2$$

and $$2NH_3 \rightarrow N_2 + 3H_2$$

In the following Table II the yield figures are given for Examples 1-5 as calculated on this theoretical basis. It will be noted that the yields calculated on this basis are substantially in agreement with the yields actually found. Differences between the yield figures determined by the two different methods are believed to be due to irregularities in evolution of volatile matter from the coke during measurement of the volume of residual gas.

A series of experiments, reported as Examples 6-14 in Table III below, was made using a mixture of propane and ammonia gas to fluidize and react in a bed of carbon particles, at a temperature of 1500° C. The volume and composiiton of the product gases were determined for each of these examples by the same methods used for Examples 1-5. Table III includes the data corresponding to that in Table I, and in addition includes the ratio of ammonia to propane in the reactant gas feed, as well as the gas feed rate. The proportion of ammonia in the product gas of each of Examples 6-14 was about 0.25% by volume.

Another series of experiments, reported as Examples 15-24 in Table IV below, was made using a mixture of methane and ammonia to fluidize and react in a bed of carbon particles held at an elevated temperature by the passage of electricity. In Examples 19 and 22 the temperature was 1400° C., in Example 15 it was 1600° C., and in the remainder of Examples 15-24 it was 1500° C. The volume and composition of the product gases were determined for each of these examples by the same methods used for Examples 1-5. The proportion of ammonia in the product gas of each of Examples 15-24 was about 0.25% by volume.

*Table I.—Carbon-ammonia*

| Ex. No. | $NH_3$ Feed, L/10 min. | Percent HCN in Prod. Gas | Percent $NH_3$ in Prod. Gas | Residual Gas, L/10 min. | HCN Yield on $NH_3$ Fed, percent | $NH_3$ Conversion, percent | HCN Yield on $NH_3$ Converted, percent |
|---|---|---|---|---|---|---|---|
| 1 | >1.67 | 12.8 | 0.241 | 2.89 | 25.4 | 99.5 | 25.5 |
| 2 | 3.50 | 15.8 | 0.00 | 5.05 | 27.1 | 100 | 27.1 |
| 3 | 3.87 | 16.6 | 0.602 | 6.50 | 33.8 | 98.8 | 34.2 |
| 4 | 3.82 | 20.8 | 0.602 | 6.02 | 42.1 | 98.7 | 42.6 |
| 5 | 3.84 | 18.9 | 0.602 | 6.13 | 38.3 | 98.7 | 38.9 |

*Table II*

| Ex. No. | Percent HCN in Prod. Gas | Percent $NH_3$ in Prod. Gas | HCN Yield on $NH_3$ Fed, Percent | $NH_3$ Conversion, Percent | HCN Yield on $NH_3$ Converted, Percent |
|---|---|---|---|---|---|
| 1 | 12.8 | 0.241 | 25.5 | 99.5 | 25.6 |
| 2 | 15.8 | 0.00 | 31.6 | 100 | 31.6 |
| 3 | 16.6 | 0.602 | 33.0 | 98.8 | 33.4 |
| 4 | 20.8 | 0.602 | 41.4 | 98.8 | 41.9 |
| 5 | 18.9 | 0.602 | 37.6 | 98.8 | 38.1 |

*Table III.—Propane-ammonia*

| Ex. No. | Gas Feed, L/10 min. | Ratio $NH_3$:$C_3H_8$ | Percent HCN in Prod. Gas | Residual Gas, L/10 min. | HCN Yield on $NH_3$ Fed, Percent | $NH_3$ Conversion, Percent | HCN Yield on $NH_3$ Converted, Percent |
|---|---|---|---|---|---|---|---|
| 6 | 3.48 | 3:1 | 25.5 | 6.21 | 81.9 | 99.2 | 82.3 |
| 7 | 3.46 | 3:1 | 26.1 | 6.21 | 85.3 | 99.2 | 86.0 |
| 8 | 3.69 | 4:1 | 25.8 | 6.74 | 80.0 | 99.4 | 80.6 |
| 9 | 3.82 | 4:1 | 26.1 | 6.86 | 79.9 | 99.4 | 80.2 |
| 10 | 3.27 | 4:1 | 25.5 | 6.25 | 82.1 | 99.4 | 82.8 |
| 11 | 3.83 | 4:1 | 25.3 | 6.52 | 81.6 | 98.9 | 82.8 |
| 12 | 3.50 | 4:1 | 26.9 | 6.50 | 86.2 | 99.4 | 86.9 |
| 13 | 3.58 | 4:1 | 26.6 | 6.58 | 83.5 | 99.2 | 84.0 |
| 14 | 3.44 | 5:1 | 27.3 | 5.47 | 71.3 | 99.2 | 72.0 |

*Table IV.—Methane-ammonia*

| Ex. No. | Gas Feed, L/10 min. | Ratio $NH_3$:$CH_4$ | Percent HCN in Prod. Gas | Residual Gas, L/10 min. | HCN Yield on $NH_3$ Fed, Percent | $NH_3$ Conversion, Percent | HCN Yield on $NH_3$ Converted, Percent |
|---|---|---|---|---|---|---|---|
| 15 | 4.16 | 2.08:3 | 12.9 | 7.07 | 60.8 | 98.9 | 61.5 |
| 16 | 4.50 | 2.08:3 | 16.4 | 7.19 | 76.0 | 99.0 | 76.9 |
| 17 | 4.50 | 2.88:3 | 19.5 | 6.89 | 74.8 | 99.0 | 75.5 |
| 18 | 4.50 | 3.65:3 | 19.8 | 6.89 | 69.4 | 99.4 | 69.9 |
| 19 | 4.66 | 4:3 | 19.3 | 7.01 | 62.6 | 99.1 | 63.1 |
| 20 | 4.66 | 4:3 | 21.2 | 7.19 | 72.5 | 99.1 | 73.0 |
| 21 | 4.46 | 4:3 | 19.7 | 7.47 | 72.1 | 99.3 | 72.6 |
| 22 | 4.46 | 4:3 | 19.7 | 7.05 | 67.4 | 99.3 | 67.9 |
| 23 | 4.56 | 4.5:3 | 20.2 | 7.29 | 67.5 | 99.4 | 67.9 |
| 24 | 3.98 | 5:3 | 20.0 | 5.95 | 60.8 | 98.8 | 61.7 |

From the foregoing examples, it can be seen that the invention provides an efficient process for producing hydrocyanic acid in very high yields. It can also be seen that, with the high ammonia conversions achieved, the HCN yields based on ammonia fed to the reaction are substantially as high as those based on the ammonia converted.

Although in the foregoing Examples 6-24, the gaseous reactants were mixed prior to their introduction into the reactor, the reactants can equally well be introduced into the reactor through separate inlets without prior mixing. The source of electricity for supplying the heat energy to the fluidized bed can be either direct current or alternating current. In preferred embodiments of this invention, alternating current is used, mainly because it is easier to transform and regulate.

It will also be understood that additional modifications to those already mentioned may be made in the specific embodiments disclosed without departing from the spirit of the invention or the scope of the claims.

This application is a continuation-in-part of application Number 642,684, filed February 27, 1957, which in turn is a continuation-in-part of application Number 568,325, filed February 28, 1956.

We claim:

1. A process for preparing hydrocyanic acid which comprises maintaining a bed of electrically conductive carbon particles in a fluidized state by passing upwardly through the said bed a stream of ingoing gas comprising ammonia, the contact time of the stream passing through the bed being between about 0.5 and 0.1 second, passing an electric current through the said fluidized bed with sufficient power to maintain the bed at an elevated temperature of about 1300° to 1600° C. sufficient to maintain reaction to form hydrocyanic acid, and recovering hydrocyanic acid from the outgoing gas coming off the fluidized bed.

2. A process as claimed in claim 1 in which the ingoing gas comprises a mixture of ammonia and hydrocarbon gas.

3. A process as claimed in claim 2 in which the ratio of moles of ammonia to atoms of carbon in the hydrocarbon gas is greater than one.

4. A process as claimed in claim 2 in which the hydrocarbon gas is propane, and the volume ratio of ammonia to propane is between 3:1 and 5:1.

5. A process as claimed in claim 2 in which the hydrocarbon gas is methane, and the volume ratio of ammonia to methane is between 1:1 and 5:3.

6. A process as claimed in claim 1 in which the carbon particles are fluid petroleum coke, by-product of a fluid bed petroleum cracking process.

7. A process as claimed in claim 1 wherein the ingoing gas consists of ammonia.

8. A process as claimed in claim 1 wherein the ingoing gas consists of ammonia containing ½ to 2% by volume of carbon disulphide.

References Cited in the file of this patent

UNITED STATES PATENTS

| | | |
|---|---|---|
| 1,584,137 | Poindexter | May 11, 1926 |
| 1,857,799 | Winkler | May 10, 1932 |
| 2,475,607 | Garbo | July 12, 1949 |
| 2,799,640 | Pevere et al. | July 16, 1957 |